J. H. PAYTON.
Riding Plows.

No. 152,507.

Patented June 30, 1874.

WITNESSES:
E. Wolff.
Sedgwick

INVENTOR:
J. H. Payton
BY
ATTORNEYS.

UNITED STATES PATENT OFFICE.

JOHN H. PAYTON, OF RANTOUL, ILLINOIS.

IMPROVEMENT IN RIDING-PLOWS.

Specification forming part of Letters Patent No. 152,507, dated June 30, 1874; application filed March 28, 1874.

*To all whom it may concern:*

Figure 1:
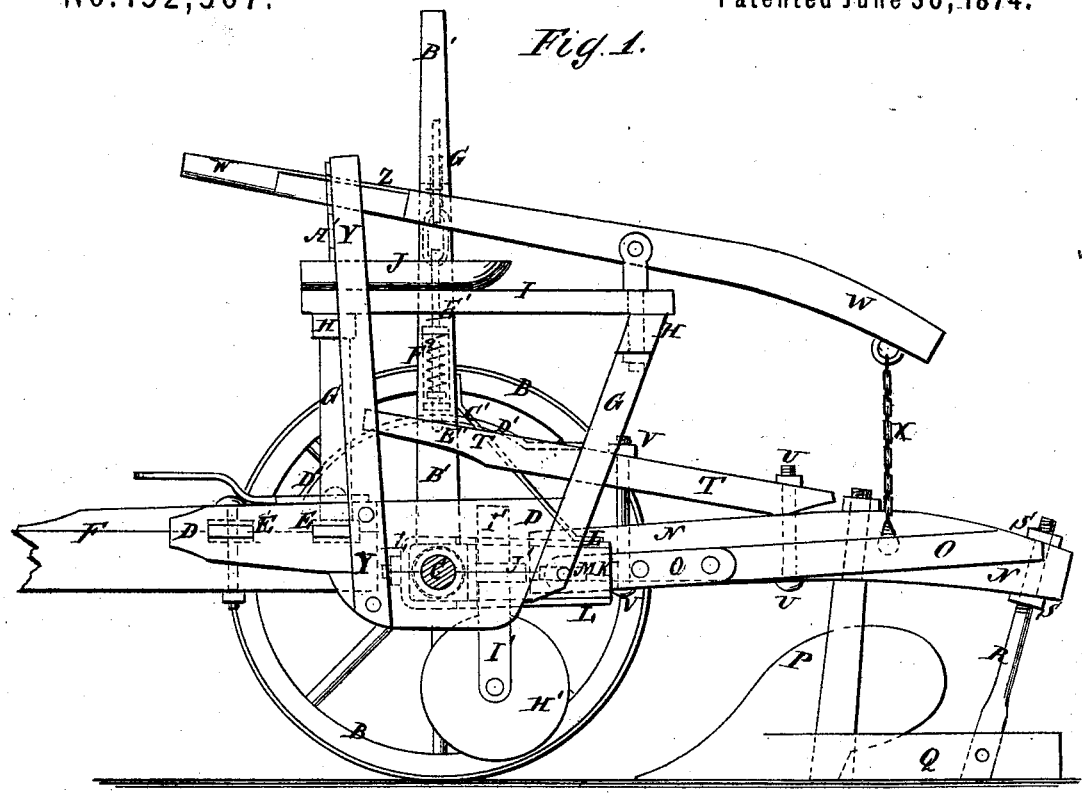
Figure 2:
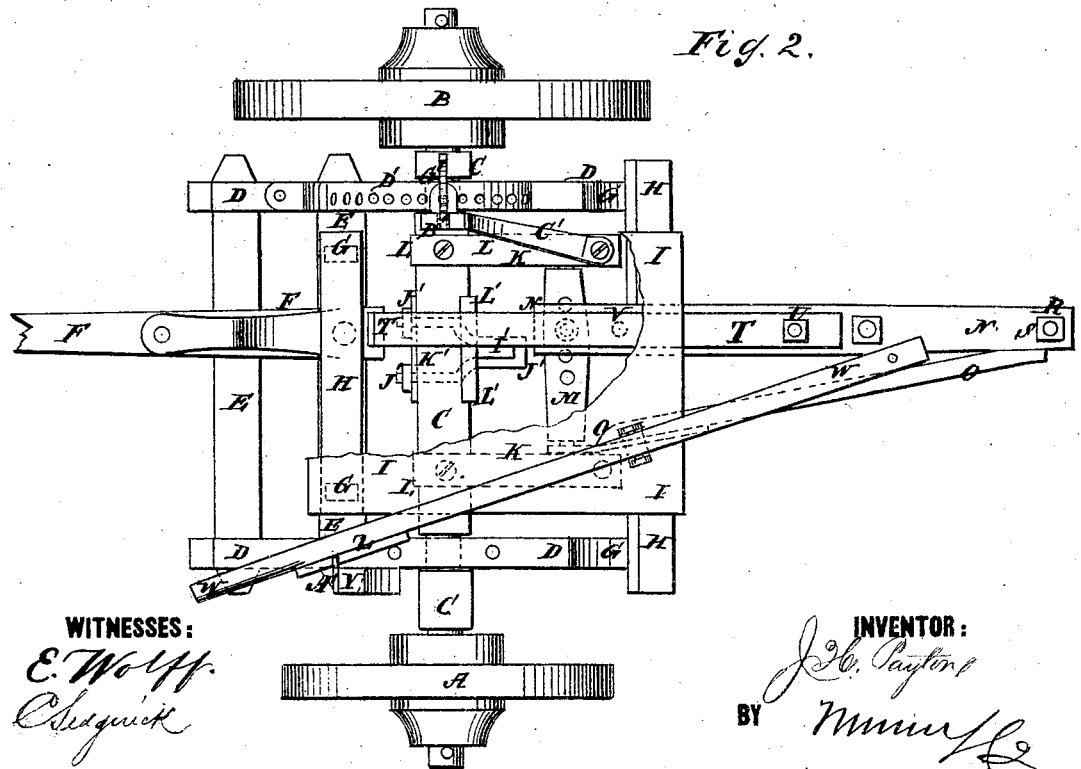

Be it known that I, JOHN HINKLE PAYTON, of Rantoul, in the county of Champaign and State of Illinois, have invented a new and useful Improvement in Riding-Plow, of which the following is a specification:

Figure 1 is a side view of my improved machine, the land-side wheel being removed. Fig. 2 is a top view of the same, the driver's seat and part of the platform being removed to show the construction.

Similar letters of reference indicate corresponding parts.

My invention has for its object to furnish an improved riding or sulky plow, which shall be simple in construction, strong, and durable, and which shall be so constructed that it may be readily adjusted to plow deep or shallow, or to turn a wide or a narrow furrow, which may be easily raised from and lowered into the ground, which shall not be liable to choke, may be very easily controlled, and will be held firmly in place when at work.

The invention will first be fully described, and then pointed out in the claims.

T is a guard or gage beam, the rear end of which is beveled off upon its lower side, and is secured to the upper side of the middle part of the plow-beam N by a bolt, U, passing up through the plow-beam N, and through the gage-beam T, so that by adjusting the nut of the bolt U the inclination of the said gage-beam T may be adjusted as required. The beam T is strengthened against the downward draft of the plow by the second bolt V, which also passes through the plow-beam N and gage-beam T, and has a nut screwed upon its upper end, against which the upper side of the beam T strikes. The forward end of the gage-beam T, when the plow is in working position, rests upon the rear end of the tongue F, so as to hold the plow firmly, and at the same time gage the depth to which the plow enters the ground. H' is a rotary cutter, which is placed in and pivoted to the slotted or forked lower end of the standard I'. The upper part of the standard I' passes up across the rear side of the axle C and through the loop of the bow or staple J', the arms of which pass through a horizontal slot in the said axle C, and have nuts screwed upon their ends. K' is a plate placed upon the forward side of the axle C, and having holes formed through it for the arms of the staple J'. The plate K' is designed for the nuts of the staple J' to rest against to give them a firm support. L' is a block interposed between the standard I' and the axle C, and through a hole in which the arms of the staple J' pass. The forward side of the block L' has flanges formed along its upper and lower edges, to overlap the top and bottom of the axle C, and prevent the said block from turning upon said axle. The block L' has a transverse notch formed across its rear side to receive the edge of the standard I', and prevent it from turning upon said block.

By this construction, by loosening the nuts of the staple J', the cutter may be raised and lowered to adjust it to work deeper and shallower in the ground, and moved laterally to adjust it to a wider or narrower plow. By this construction the cutter is rigidly connected with the axle C, so as to be entirely independent of the plow, and so as to be held firmly to its work.

Having thus described my invention, I claim as new and desire to secure by Letters Patent—

1. The combination of the adjustable gage-beam T, and the adjusting-bolts U V, with the plow-beam N, substantially as herein shown and described.

2. The combination of the bow or staple J', the perforated plate K', and the flanged and notched perforated block L' with the rock-axle C, and with the standard I' of the rotary cutter H', substantially as herein shown and described.

JOHN HINKLE PAYTON.

Witnesses:
 W. G. BARROWS,
 A. H. BÖHNE.